Nov. 14, 1967   W. E. ULBRICHT ET AL   3,352,123
SYSTEM FOR COOLING, TRANSPORTING AND WARMING
UP DOUBLE BARRIER LIQUEFIED GAS CARGO TANKS
Filed Feb. 21, 1966   2 Sheets-Sheet 1

INVENTORS
WALTER E. ULBRICHT,
DONALD R. YEARWOOD,
NORMAN K. BASILE
BY Stevens, Davis, Miller & Mosher
ATTORNEYS

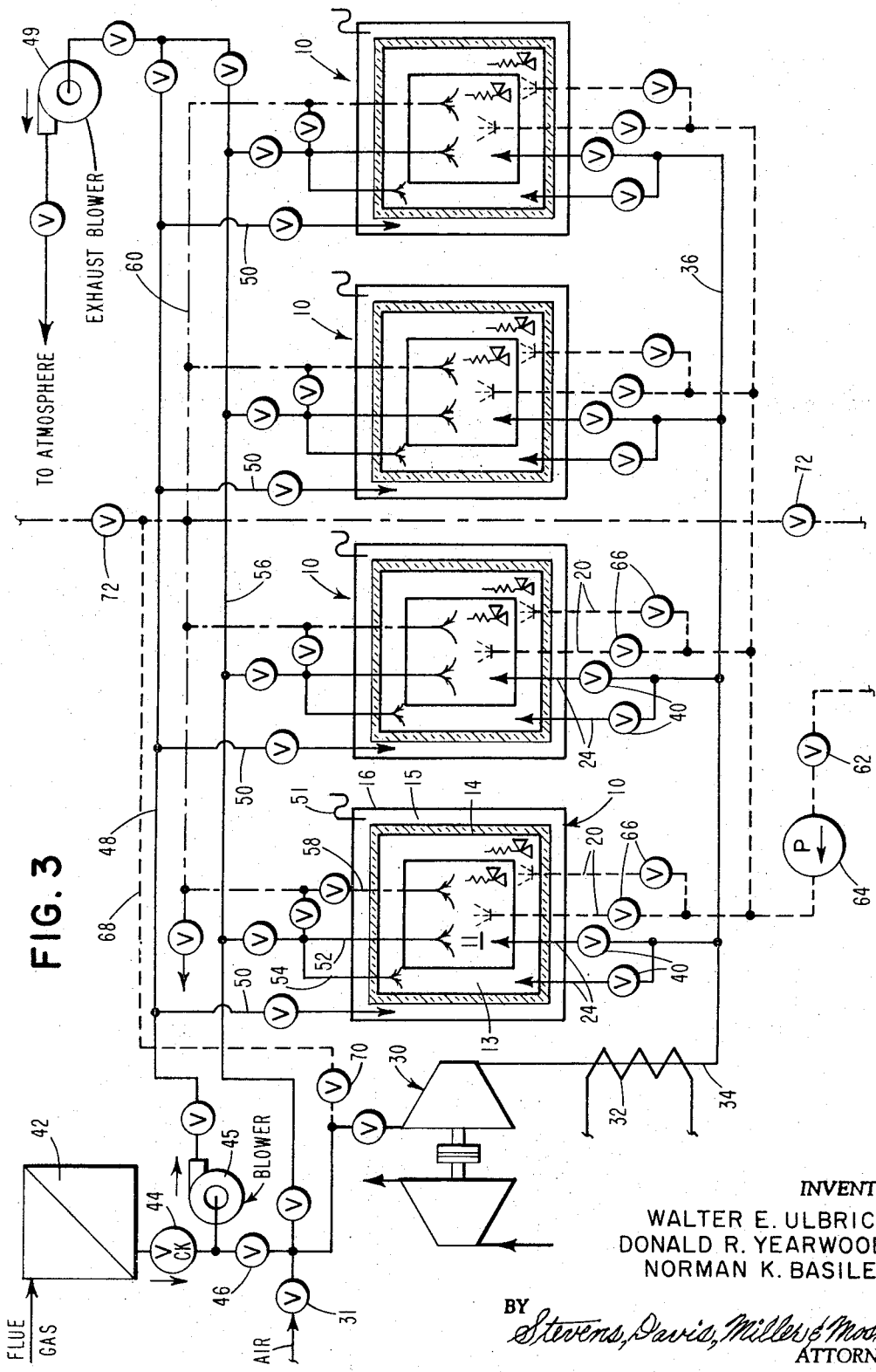

United States Patent Office 3,352,123
Patented Nov. 14, 1967

3,352,123
SYSTEM FOR COOLING, TRANSPORTING AND WARMING UP DOUBLE BARRIER LIQUEFIED GAS CARGO TANKS
Walter Eberhard Ulbricht, New York, Donald R. Yearwood, Brooklyn, and Norman K. Basile, Bronx, N.Y., assignors to John J. McMullen, Montclair, N.J.,
Filed Feb. 21, 1966, Ser. No. 529,135
12 Claims. (Cl. 62—55)

ABSTRACT OF THE DISCLOSURE

A system for cooling and warming liquefied gas storage tanks of the double barrier free standing type arranged with a surrounding soft steel supporting structure such that a void space is defined between the supporting structure and outer tank barrier and an outer tank space is defined between the outer barrier and the inner barrier. During cool down, the system operates to purge the tank at ambient temperature by displacing the atmosphere within the inner and outer tanks with an inert gas at a relatively warm temperature and subsequently displacing this inert gas with relatively warm cargo gas. The tank barriers are then cooled by spraying directly the inner and outer barriers with liquefied gas of the type to be stored. To warm the tanks from cryogenic temperatures to ambient, the cold stored gas atmosphere is circulated through a compressor where it is heated and returned to the inner and outer tanks. When the gas is sufficiently warmed, the inner and outer tank is flushed with a warm inert gas after which they are flushed with a life supporting atmosphere. To effect uniform cooling and heating of the tank barriers without overstressing the same, a distribution piping system is provided to spray all barriers evenly with warming or cooling fluids.

---

Figure 1:
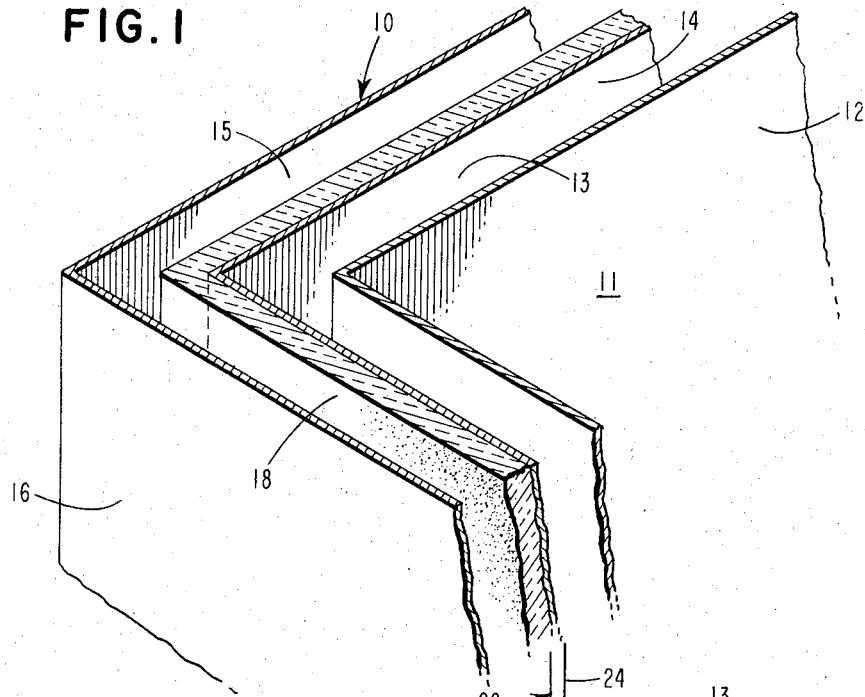

This invention relates to liquefied gas transport ships and more particularly to a system for cooling down the double barrier tanks of such vessels for loading the liquefied gas cargo therein, and for increasing the temperature of these tanks in the event maintenance or inspection is to be conducted thereon.

In the transportation of liquefied gases such as methane and the like, it is currently conventional to design ships which are fitted with insulated, double barrier storage tanks which maintain the liquefied gas at about atmospheric pressure and at a temperature below the boiling point of said gas. For the example of methane, the temperature of the liquid body must be maintained at or below $-160°$ C. The inner barrier maintains the liquefied cargo and the primary purpose of the spaced outer barrier is to act as a safety or backup system in the event cracks occur in the inner barrier. Furthermore, safety regulations require a double barrier between the liquefied cargo and the ship's structure so that, in the event the tank fails, liquefied gas will not come in contact with the outer skin of the ship.

Before filling the tanks, inert gas such as nitrogen is currently used to purge or inert the space between the inner and outer barrier as well as the inner tank space. When the tank is purged, the liquefied gas cargo is delivered to the inner tank and the inert gas (nitrogen) is left in the outer tank space thus providing an inert atmosphere within the outer barrier space.

However, this method should not be used with a self supported, double wall tank with stress connections between the inner and outer walls, because of the large stress forces that result from expansion and contraction. Moreover, the inert gas cannot contain impurities which would liquefy or sublimate above the cargo temperature. This requires a complex and expensive inert gas generating system.

It is a purpose of the present invention to avoid these problems by providing a cold methane gas atmosphere within the outer tank space. Thus, the inner and outer barriers are subjected to the same temperatures.

When the liquefied cargo is delivered and unloaded, it is present practice to leave a portion of the liquefied gas cargo within the tanks in order to maintain the tanks at a low temperature during the return trip. In this manner, the tanks need not be rechilled before again introducing a new cargo of liquefied gas into the tanks. However, regulations require that the tank barriers be inspected at least once a year and it is desirable to perform maintenance on the ship and tanks during or shortly after this inspection. It will be appreciated that the total time it takes to warm the tanks up, perform the inspection, conduct the maintenance, and cool the tanks down again should be kept at a minimum because this unproductive time is quite expensive for one of these vessels.

It is therefore a purpose of the present invention to provide a new and improved method of rapidly cooling the tanks of a vessel of the type described. The heart of the method according to the present invention comprises the technique of spraying the inner and outer barriers, which initially are above 0° C., with liquefied gas of the same type as the liquefied cargo to be stored. As the liquefied gas contacts the walls of these barriers, it runs downward and quickly cools the walls. Most of the liquid vaporizes at or shortly after contacting the barrier. When the tanks reach a temperature of about $-160°$ C., in the case of methane, liquid methane spraying of the barriers is terminated and liquid methane cargo is fed directly into the inner tank. The gaseous methane atmosphere in the outer tank space becomes heated to slightly above the boiling point of methane for the purposes to be described below.

In order to directly spray the relatively hot barriers with liquefied methane without producing an explosive mixture, the inner and outer tank spaces must be properly prepared. It is also in accordance with the present invention to purge the inner and intra barrier spaces with purified flue gas (mostly nitrogen and $CO_2$) to provide an inert atmosphere in these spaces. Subsequently, hot methane gas at about $+10°$ C. is fed into these spaces to displace the flue gas and provide a gaseous methane atmosphere therein. It is only after the methane atmosphere is established that liquid methane is sprayed on the barriers and in this way, since there is already a gaseous methane atmosphere, there is little chance of explosion or damage when the fine methane liquid spray contacts the relatively hot barrier.

As mentioned above, maintenance and inspection cannot be conducted on the tanks until their temperature is increased to that of the ambient and all spaces therein filled with air. Because of the volatile nature of methane and possibility of explosion, air cannot be introduced into a gaseous methane atmosphere and all tanks and spaces must be inerted before air is introduced.

It is also a purpose of the present invention to provide a new and improved method of rapidly raising the temperature of all tanks of a vessel of the type described, the major part of raising the temperature capable of being done at sea without the need of on-shore connections or facilities. Before heating the tanks, the liquefied cargo is removed or otherwise delivered from the tanks leaving a methane gas atmosphere in the inner tank space. Basically, the heating method of the present invention comprises circulating the gaseous methane atmosphere of said inner and outer tank space through a compressor and heat exchanger which heats the same and redelivering the heated methane gases back to the inner and outer tank spaces to thus raise the tank temperature. When all tanks (there may be four tanks carried within one vessel) reach a predetermined temperature, purified flue gas is fed to the inner and outer tank spaces to displace the relatively hot methane gases therein and further increase the tank temperatures. When all tanks and spaces are filled with purified flue gas and a second predetermined temperature is reached, the vessel then can pull into port where all tanks and spaces are flushed with air after which the ship and tanks are ready for inspection.

It is therefore an object of the present invention to cool down a double barrier tank of the type described by directly spraying the inner and outer barriers and inner and outer tank spaces with liquid methane.

It is also an object of the present invention to fill the outer tank space with a cold gas of the same type that is carried in liquefied form in the inner tank space.

It is still a further object of the present invention to provide a method of preparing the tanks of the type described for filling with liquefied methane and the like by displacing the hot inert gas in the inner and outer tank spaces with the hot methane gas prior to spraying the spaces and barriers with liquid methane.

It is yet a further object of the present invention to provide a method for heating, inerting and flushing with air tanks of the type described which comprises circulating the cold methane atmosphere through a compressor, heating the same and returning the hot methane gases to the inner and outer tank spaces in order to raise the temperature of the tank.

It is another object of the present invention to provide a ship having tanks of the type described which comprises an inner barrier and a spaced outer barrier with liquefied gas cargo at least partially filling said inner barrier and an atmosphere of cold gas of the same type as said cargo filling the space between the inner and outer barrier.

Figure 2:
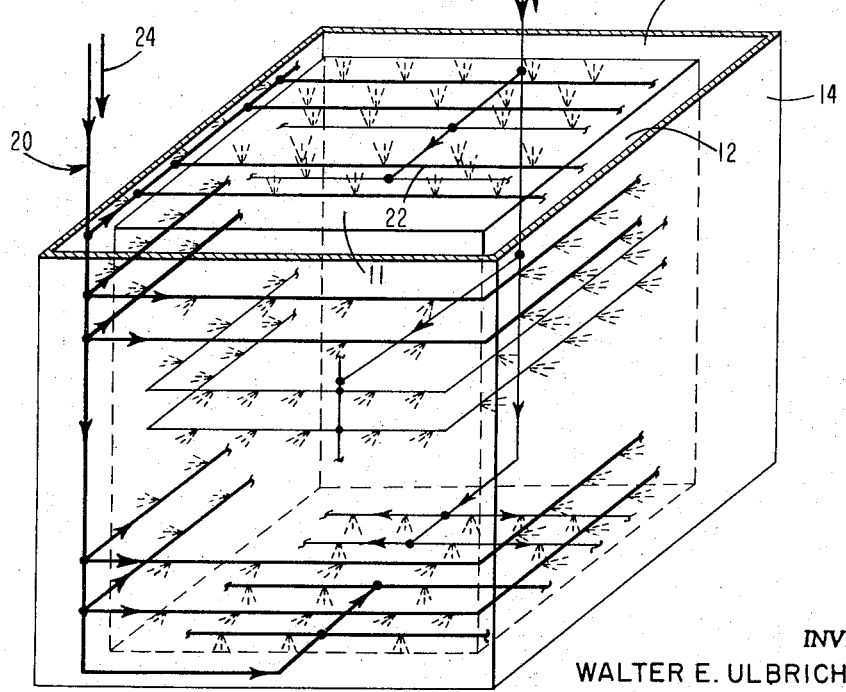

Other and further objects of the present invention will become apparent with the following detailed description when taken in view of the appended drawings in which:

FIG. 1 is a schematic illustration partly broken away of the insulated double-barrier tank showing its relation to the ship's structure;

FIG. 2 schematically illustrates a perspective of the double-wall tank with the liquefied gas piping system also shown schematically; and FIG. 3 is a schematic illustration of a plurality of tanks with the fluid delivery and removal system also illustrated schematically.

Referring to the drawings in detail, FIG. 1 illustrates a liquefied gas transport tank generally indicated as 10 having an inner wall or barrier 12 and spaced outer wall or barrier 14. The relative positions of barriers 12 and 14 is maintained by a girder or web-ring system (not shown). Spaced outward from the outer barrier 14 is the ship's supporting structure 16 which could comprise the bulkheads or inner hull of the ship. Insulation 18 in the form of rockwool sheets and the like cover the exterior of outer barrier 14 in order to provide additional thermal insulation between the low temperature fluids and the ship's structure. If desired, insulation 18 could be mounted on the ship's structure and spaced from barrier 14 or alternatively insulation 18 could fill the entire space between barrier 14 and the ship's structure 16; however, the preferred arrangement is that shown in FIG. 1. The space between barrier 14 and structure 16 is hereinafter referred to as inert space 15.

Tank 10 can be a self-supporting structure and is supported in the ship by an suitable means (not shown). The bottom of tank 10 can rest directly on load-bearing insulation or can be supported by pillars and the like above the double bottom of the vessel.

According to the present invention, a first piping system 20 capable of carrying liquefied methane at about −160° C. is arranged with branches 22 extending horizontally near the outer and inner barriers 12 and 14. Branch pipes 22 are spaced vertically from each other throughout the height of tank 10. Each leg and branch of piping system 20 had a series of spray nozzles which emit a fine, uniform liquid spray directed upon the inner side of barrier 12 and the inner side of barrier 14, as well as the tops and bottoms of these barriers.

A second piping system 24 capable of carrying relatively hot methane gas, inert gas, or air also extends into the outer tank space 13 and inner tank space 11. Piping system 24 also has branches which parallel that of piping system 20 but these are not shown on FIG. 2 in order to avoid confusing the figure. Each branch of piping system 24 also has a plurality of series of openings therein.

With reference to FIG. 3, a conventional turbine-driven compressor 30 is provided with externally mounted heat exchanger 32, which has an outlet 34 which feeds a discharge line 36. The compressor has a heat exchange capability of changing the temperature of fluid passing therethrough by about 80° C. Discharge line 36 is fluidly coupled to piping system 24 of each tank 10 through a set of valves 40.

A purifying unit or gas cleaner unit 42 receives flue gas from the ship's boiler, cools, filters and purifies the same, and delivers the purified gas when necessary to the inlet of compressor 30 through check valve 44 and stop valve 46. Purifiers of this type are conventional and have a delivery rate of approximately 50,000 cubic meters per hour. In order to purge or inert the inert space 15 for each tank, valve 46 is closed, then the flue gas is delivered by blower 45 directly to the inert discharge line 48 which feeds a line 50 communicating with the inert space 15 for each tank 10. A number of suction pipes 52 and 54 have a plurality of openings in the inner tank space 11 and outer tank space 13 in order to draw off gases therein, and feed the same to compressor suction line 56 through appropriate valves 58. Line 56 feeds the input of compressor 30, and an exhaust blower 49 is connected to lines 48 and 56 through appropriate valves.

An additional suction line 58 normally supplies cargo boil-off for combustion and is connected to the secondary barrier space through pipe 54 to maintain a pressure balance between barriers during normal operation.

The physical arrangement of pipes 52 and 54 can be any suitable one to sufficiently draw fluids from all parts of the inner and outer tank spaces.

A shore line connection 62 supplies tanks 10 with a source of liquefied methane at −160° C. A pump 64 couples connections 62 with the liquid piping system 20 through a set of valves 66. A delivery line 68 also extends from connection 62 through valve 70 to the input line of compressor 30.

Yet another shore connection 72 connects a source of relatively cold methane gas to the compressor via line 68 and valve 70 as well as tank lines 58 and appropriate valves.

The method of the present invention will now be described in detail with reference to a ship containing four 19,000 cubic meter tanks in which liquefied methane is transported. After the tanks and ship have been inspected or worked upon, the tank temperature must be cooled down to approximately −160° C. before the liquid methane is fed to the cargo space. With the ship structure at ambient temperature and containing an atmosphere of air, the inner tank space 11 and outer tank space 13 are purged with volumes of inert gas at roughly +10° C. Unlike conventional systems which require a nitrogen generating plant for inerting purposes, boiler flue gas at about 150–200° C. is fed to purifying unit 42 which feeds compressor 30 with a gas which is mostly nitrogen and $CO_2$. Purifier 42 extracts from the flue gas active ingredients, such as $SO_3$ and $SO_4$, as well as the moisture and solids. Coils 32 cool this gas to approximately +10° C.

The gas is then fed to compressor discharge line 36 and subsequently into inner and outer tank space 11 and 13. During this time, air within the tank is removed through pipes 52 and 54 and fed to the atmosphere through blower 49. This step of inerting the tanks requires about six hours and the use of flue gas enables this step to be done at sea. Inert space 15 for each tank is also purged with relatively cool flue gas which is fed through lines 48 and 50. Water column 51 indicates positive pressure in space 15.

The tanks and inert space can be successively inerted or, if desired, an additional compressor unit can be used to simultaneously inert two or more of the tanks which results in a shorter purging period.

Upon reaching port and making the shore connections 62 and 72 to liquefied and gaseous methane supplies, cold methane gas at approximately −160° C. is fed through and heated by compressor 30 and heat exchanger 32. It is then fed through the piping systems 36 and 24 and into the inner and outer tank spaces 11 and 13 to displace the inert gases therein. Gases are drawn off through lines 52 and 54 and fed to the atmosphere through line 56 and blower 49. The time required to displace the inert gas with relatively hot methane gas is approximately three hours when only one compressor unit 30 is used.

Once the inner and outer tanks are filled with relatively hot methane gas, pump 64 is energized and delivers liquefied methane at approximately −160° C. and at a rate of about 70.0 cubic meters per hour through the piping system 20 of the first tank. As described above, this results in spraying barriers 12 and 14 including the tank tops and bottoms with liquefied methane which, upon contact therewith, rapidly cools the tank barriers and spaces therein. As the liquefied methane strikes relatively hot walls, it tends to vaporize; however, since the atmosphere therein is already gaseous methane, no possibility of explosion exists. It is preferred that the liquid spray on barriers 12 and 14 be fine so that the heat exchange action occurs quickly. The vaporized methane is returned to shore through pipes 52, 54, 60 and connection 72.

This step continues until the tank barriers and spaces reach a temperature of approximately −160° C. Thereafter, liquefied methane cargo is fed to cargo space 11 while the next tank in the ship is being cooled. It is important to note that the methane gas forming in the outer tank space 13 remains therein at a temperature slightly above the boiling point of the cargo in space 11. Space 11 is partially or completely filled with liquefied methane. The space above the liquid cargo is maintained at the same pressure as the gas in space 13. In this way, the possibility of the methane gas therein condensing in space 13 is eliminated.

The time required to completely cool the tanks and spaces to −160° C. takes approximately twenty hours for all four tanks within the ship.

With inner tanks 12 filled, the ship can then transport the same to the desired port. Upon removing the liquefied cargo from tanks 12, a portion thereof remains therein for the return trip in order to keep the tanks and spaces at approximately −160° C. Thus, when the tanks are to be refilled, it is not necessary to re-chill the tanks.

In the event the ship or tanks are to be inspected or worked upon, the entire liquid cargo is removed from inner tanks 12 which leaves a certain amount of gaseous methane therein. Subsequently, the gaseous methane from inner and outer tank spaces 11 and 13 of the first tank is drawn through pipes 52 and 54 and delivered to the compressor unit 30 and heating coils 32. This gas is thereby heated due to the heat exchange action of compressor unit 30 and heat exchanger. The temperature differential of the incoming and outgoing gas to compressor unit 30 is approximately 80° C. The relatively hot gas is then refed to the inner and outer tank spaces 11 and 13 through piping system 24. Pressure in the closed circuit system is maintained constant by relief valves (not shown) located near the top of tank 10 and which bleed to the atmosphere. This closed circuit action continues at about 1.5 volume changes per hour until the tank temperature reaches a predetermined value such as −30° C. at which time the same step is conducted on the next tank 10. It takes approximately 32 hours to raise the temperatures of all four tanks 10 from −160° C. to −30° C.

Next, tank spaces 11 and 13 are inerted by feeding relatively cool (0° C. to 50° C.) purified flue gas through the compressor discharge line 36 into the tank spaces. These spaces are purged and the gases therein withdrawn through line 56 and delivered to the atmosphere through blower 49 until the atmosphere of all four tank spaces 11 and 13 comprises the flue and the temperature reaches a predetermined value, for example, −10° C. The inerting takes roughly eight hours for four tanks.

At this point, air inlet valve 31 is opened and all tank spaces 11 and 13 are flushed with ambient air for about eight hours utilizing the above mentioned procedure for inerting. After this step, the tanks are ready for inspection or maintenance.

It should be understood that various modifications can be made to the herein disclosed examples without departing from the scope of the present invention.

What is claimed is:

1. A method of cooling a liquefied gas storage tank which has an inner barrier and a spaced outer barrier which defines isolated inner and outer tank spaces and which stores at about ambient pressure cryogenic liquefied gas, the barriers being initially at ambient temperature, said method comprising the step of cooling said barriers by simultaneously and generally uniformly spraying liquefied gas of the type to be stored into the inner tank space and the space between said barriers.

2. A method of cooling a liquefied gas storage tank which has an inner barrier and a spaced outer barrier which defines isolated inner and outer tank spaces and which stores at about ambient pressure cryogenic liquefied gas, the barriers being initially at ambient temperature, said method comprising the step of cooling said barriers by simultaneously and generally uniformly spraying liquefied gas of the type to be stored directly on the inner and outer barriers.

3. A method of preparing for and loading a liquefied gas storage tank arranged on a ship, said tank having inner and outer spaced barriers to define inner and outer tank spaces, the liquefied gas to be stored having an extremely low boiling temperature at approximately ambient pressure, said method comprising purging when said tank is at ambient temperature the inner and outer tank spaces with an inert gas at a temperature above 0° C., subsequently displacing said inert gas in said inner and intra tank spaces with gas above 0° C. of the type to be transported, subsequently cooling said barriers and spaces by directly spraying said inner and outer barriers with liquefied gas of the type to be stored.

4. A method as set forth in claim 3 wherein said step of purging comprises feeding purified boiler flue gas into said inner and outer tank spaces.

5. A method as set forth in claim 3 further comprising loading said inner tank space with liquefied gas after the barriers and their spaces reach a predetermined low temperature, and maintaining in the outer tank space the gas which forms as a result of directly spraying the outer barrier with liquefied gas.

6. A method as set forth in claim 5 wherein the ship structure is spaced outward from said second barrier to form an inert space, said method further comprising filling said inert space with an inert gas.

7. A method of heating a liquefied gas storage tank arranged on a ship which carries at ambient pressure a liquefied gas which has an extremely low boiling point, said tank having an inner barrier and a spaced outer barrier to form inner and outer tank spaces, liquefied gas stored in the inner tank space and an atmosphere of cold gas of the type stored filling the outer tank space, said method comprising removing the liquid body from said inner tank space, which leaves therein a cold gas atmosphere of the type stored, circulating the gas in said inner and outer tank spaces through a compressor, heating the same and delivering the heated gas back to said inner and outer tank spaces until a predetermined tank temperature is reached.

8. A method as set forth in claim 7 further comprising subsequently inerting the inner and outer tank spaces by displacing the gas therein with a warmer inert gas.

9. A method as set forth in claim 8 wherein said last mentioned step includes feeding purified flue gas through the compressor to the tank spaces.

10. A method as set forth in claim 9 wherein said feeding begins when the tank temperature reaches about −30° C. and ends when the tank temperature reaches about −10° C., and after inerting said barrier spaces, flushing the tank spaces with ambient air.

11. A system for transporting cryogenic liquefied gas at about ambient pressure comprising a tank mounted in a vessel comprising a liquid and gaseous impervious inner barrier, a spaced liquid and gaseous imprevious outer barrier to form isolated inner and outer tank spaces, liquefied gas at least partially filling said inner tank space, and an atmosphere of gas of the type stored filling the space between said inner and outer barriers.

12. A method as set forth in claim 3, wherein said barriers are sprayed evenly so that the contraction rates of said barriers are the same.

References Cited

UNITED STATES PATENTS

| | | | |
|---|---|---|---|
| 966,076 | 8/1910 | Bobrick | 62—45 |
| 2,916,889 | 12/1959 | Sattler | 62—55 |
| 2,922,287 | 1/1960 | Rae | 62—55 |
| 2,986,011 | 5/1961 | Murphy | 62—55 |

FOREIGN PATENTS

| | | |
|---|---|---|
| 1,161,620 | 3/1958 | France. |
| 864,709 | 4/1961 | Great Britain. |

LLOYD L. KING, *Primary Examiner.*